US009122390B2

(12) United States Patent
Costigan et al.

(10) Patent No.: US 9,122,390 B2
(45) Date of Patent: Sep. 1, 2015

(54) METHOD, APPLICATION AND/OR SERVICE TO COLLECT MORE FINE-GRAINED OR EXTRA EVENT DATA FROM A USER SENSOR DEVICE

(71) Applicant: Behaviometrics AB, Lulea (SE)

(72) Inventors: Neil Costigan, Lulea (SE); Ingo Deutschmann, Merseburg (DE); Tony Libell, Lulea (SE); Johan Lindholm, Boden (SE); Peder Nordström, Lulea (SE)

(73) Assignee: BEHAVIOMETRICS AB, Lulea (SE)

( * ) Notice: Subject to any disclaimer, the term of this patent is extended or adjusted under 35 U.S.C. 154(b) by 238 days.

(21) Appl. No.: 13/866,190

(22) Filed: Apr. 19, 2013

(65) Prior Publication Data
US 2013/0283201 A1 Oct. 24, 2013

Related U.S. Application Data

(60) Provisional application No. 61/637,581, filed on Apr. 24, 2012.

(51) Int. Cl.
*G06F 3/0488* (2013.01)
*G06F 3/041* (2006.01)

(52) U.S. Cl.
CPC ............ *G06F 3/0488* (2013.01); *G06F 3/0416* (2013.01); *G06F 3/04886* (2013.01)

(58) Field of Classification Search
CPC .......... G06F 3/14; G06F 3/016; G06F 3/0488
See application file for complete search history.

(56) References Cited

U.S. PATENT DOCUMENTS

| | | | | | |
|---|---|---|---|---|---|
| 4,476,463 | A | * | 10/1984 | Ng et al. | 345/174 |
| 5,404,443 | A | * | 4/1995 | Hirata | 725/75 |
| 5,757,358 | A | * | 5/1998 | Osga | 715/862 |
| 5,982,352 | A | * | 11/1999 | Pryor | 345/156 |
| 6,587,131 | B1 | * | 7/2003 | Nakai et al. | 715/857 |
| 7,126,583 | B1 | * | 10/2006 | Breed | 345/158 |
| 8,261,211 | B2 | * | 9/2012 | Pahud et al. | 715/856 |
| 8,334,841 | B2 | * | 12/2012 | Boillot et al. | 345/158 |
| 8,468,550 | B2 | * | 6/2013 | Pearson | 719/319 |
| 2003/0179243 | A1 | * | 9/2003 | Numano | 345/782 |
| 2005/0052406 | A1 | * | 3/2005 | Stephanick et al. | 345/156 |
| 2008/0129704 | A1 | * | 6/2008 | Pryor | 345/173 |
| 2009/0128505 | A1 | * | 5/2009 | Partridge et al. | 345/173 |
| 2010/0169818 | A1 | * | 7/2010 | Hughes et al. | 715/773 |
| 2012/0176343 | A1 | * | 7/2012 | Holmgren et al. | 345/175 |
| 2012/0299881 | A1 | * | 11/2012 | De Muelenaere et al. | 345/179 |
| 2013/0249809 | A1 | * | 9/2013 | Kawalkar et al. | 345/173 |

\* cited by examiner

*Primary Examiner* — Phenuel Salomon
(74) *Attorney, Agent, or Firm* — Michael J. Feigin, Esq.; Feigin & Associates, LLC PatentLawNY.com

(57) ABSTRACT

An apparatus with a method, and or application, and or service to collect more fine rained or extra event data, that may not be accessible directly by the underlying architecture. This is been done by adding a virtual overlay over selected portion of the screen and detecting events inside or outside of his own context.

6 Claims, 2 Drawing Sheets

Mobile device with virtual graphical overlay

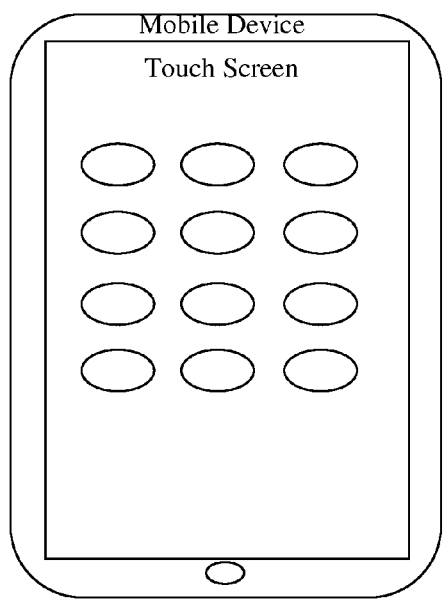
FIG. 1 Example System with Sensory Device on which Process Operates
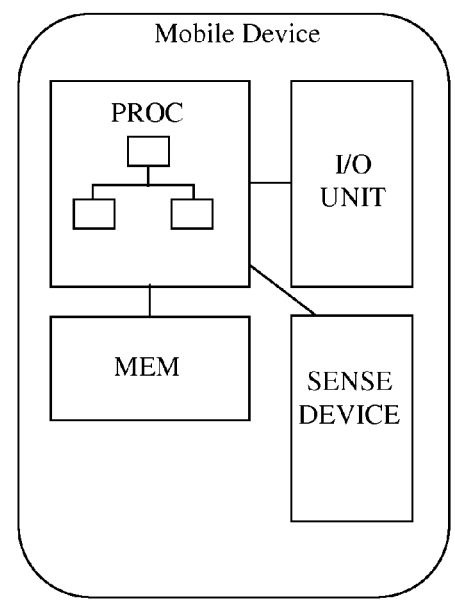
FIG. 2 Example System with Sensory Device on which Process Operates

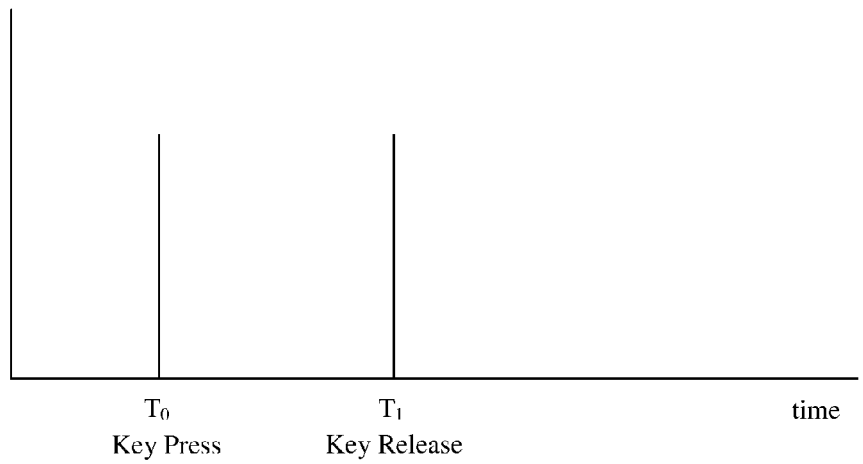
FIG. 3 Timing Diagram for Key Press / Release
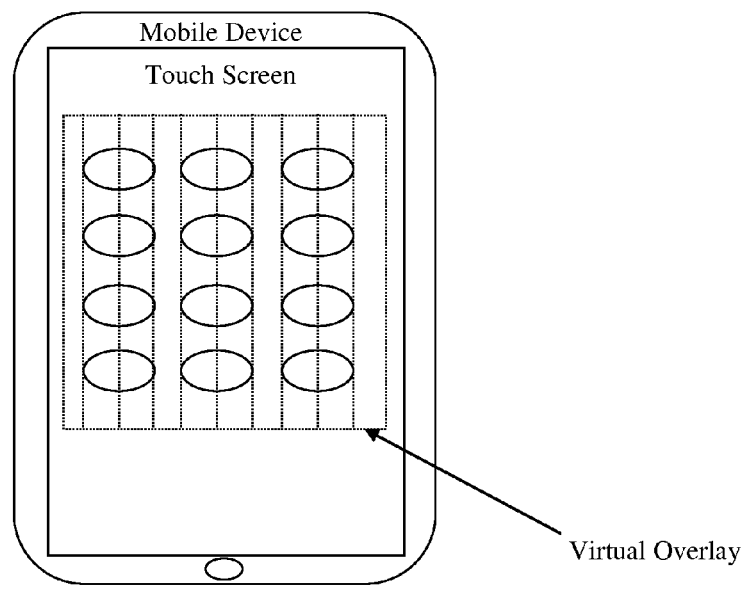
FIG. 4 Mobile device with virtual graphical overlay

METHOD, APPLICATION AND/OR SERVICE TO COLLECT MORE FINE-GRAINED OR EXTRA EVENT DATA FROM A USER SENSOR DEVICE

FIELD OF THE DISCLOSED TECHNOLOGY

The present invention describes a method, application, and/or service to collect more fine-grained or extra event data from a touch display that may not be accessible directly by the underlying architecture.

BACKGROUND OF THE DISCLOSED TECHNOLOGY

Computing devices, such as mobile handsets, are traditionally designed to deliver performance on restricted hardware. Since there is no 'built-in security' commonly found on purpose built computers with increased mobility (e.g., smart phones), information stored in the computing devices is much more likely to end up in the wrong hands. Adding smart card readers or expecting users to carry One-Time-Password tokens (OTPs) to use with the computing devices is not realistic. Out-of-band solutions such as SMS or other communications protocols are cumbersome and not user friendly for widespread use. People pick weak passwords that are easy to remember or just easy to type on a handset and voice biometric solutions are expensive and disrupt the user experience. Multilayered security can be achieved by combining three pillars: (i) something you have (e.g., the phone as a token), (ii) something you know (e.g. your PIN), and (iii) something you are (e.g., your physical or behavioral metrics).

One problem that exists; is the problem that the operating system is not giving access to the highest available accurate sensory data received from a user using a computing device, such as a user touching a touch screen of a smart phone, to applications. As a result, the applications are left to the available accuracy of the operating system.

SUMMARY OF THE DISCLOSED TECHNOLOGY

The principles of the present invention describe an apparatus with a method, and or application, and or service to collect more-fine rained or extra event data, that may not be accessible directly by the underlying architecture. This is been done by adding a virtual overlay over a selected portion of the screen and detecting events inside or outside of his own context.

BRIEF DESCRIPTION OF THE DRAWINGS

The accompanying drawings, which are incorporated into and constitute a part of the specification, illustrate one or more example embodiments of the invention and, together with the detailed description serve to explain their principles and implementations.

FIG. 1 is shown an example system with sensory device on which the process operates, FIG. 2 is shown an example system with sensory device on which the process operates, FIG. 3 is shown a timing diagram for key press/release, FIG. 4 is shown a mobile device with virtual graphical overlay.

DETAILED DESCRIPTION OF EMBODIMENTS OF THE DISCLOSED TECHNOLOGY

The principles of the present invention described herein provide for a virtual interface to be layered on top of or below the normal interface provided by the operating system, thus providing improved accuracy for the applications, service, or system. In a computing system, such as a desktop computer, laptop computer, or mobile device, the underlying operating system provides information about external events, such as, but not limited to, data entry, mouse movements and touch events from a sensor, such as a touch screen, to applications, service or the system itself. Often, user sensory input is limited to resolution that the computing system provides. As an example, operating systems like Android, iOs as well as WIN8 don't deliver fine-grained access to touch events as well as key events. However, an application may require or desire more detail to than is directly given to perform optimally or at all.

If finer grained event accuracy is required than is available from the operating system, mobile device or desktop computer, the system may overlay the input with a virtual interface on top of the normal interface provided by the operating system. The overlay can capture events at a higher resolution, and then filter the events to match against information provided by the operating system, thus providing necessary accuracy for the application, service or system.

Such a resolution increase process may be done by overlaying a transparent or not transparent graphic window layer on top or below of the Graphic User Interface (GUI) to catch events for underlying widgets, applications or other system resources. The extra window layer may be on top or below a selected portion of or the entire screen. The process can detect events outside or inside of its own context. The method may adding a background process to catch events from running applications.

EXAMPLE

An example of providing a virtual interface with higher resolution may be where the operating system provides information limited to one event trigger for both an up and a down key press from a soft keyboard on a mobile handset.

The operating system may provide the same, or almost the same, timings for down and up event when a key is physically touched on a soft keyboard (soft key input). The time difference received from the operating system does not reflect the actual time taken between the push and release of the key. To solve this problem, a view with a touch callback interface (touch listener) is overlaid on top of the screen. This can be done by adding it in one small space (could be, but not limited to 1 px by 1 px) in for example the top corner of the screen, listening for touches outside that view. Alternatively this can be done, by adding it as a screen that is on top over the whole screen, listening to a touch inside the view, or any part of the screen. Every time a touch is registered by the on top view, a variable is set to that time. Now when a key up event is registered, the time for the key down event is set to the last time a touch event occurred.

FIG. 1 is an illustration of an illustrative mobile device with a touch screen device for use in enabling a user to operate the mobile device. Although shown as a mobile device, it should be understood that non-mobile devices may utilize the principles of the present invention, as well. FIG. 2 is a block diagram of the mobile device of FIG. 1 showing internal electronic components, including a processing unit, memory, input/output unit, and sense device (e.g., touch screen). The processing unit is shown to include software that may be executed by the processing unit to provide for a virtual input overlay to sense higher resolution touch and/or timing of the sense device, such as the touch screen of FIG. 1. The processing unit, in response to a user touching the sense device, may execute the software to associate the user's operation with the virtual input overlay, as previously described. In one embodiment, the memory may store the virtual input overlay, and as input data is received by the processing unit, the input data may be correlated with the virtual input overlay. It should be understood that the drawings of the mobile device are illustrative and that additional and/or different components may be utilized in supporting and performing the processes described herein.

FIG. 3 is an illustrative timing diagram that operation of a virtual input overlay. The virtual input overlay allows for collection of times for both touch and release of a sense device, such as a touch screen. By being able to capture both touch and release times, features or applications that are otherwise not possible to get higher resolution data due to limitations with an operating system of an electronic device, such as a smart phone, may be provided. By way of example, a conventional smart phone provides for sensing that a softbutton (see FIG. 1) on a touch screen was pressed, but not touch time and release time, as provided in FIG. 3.

FIG. 4 shows a mobile device with a virtual graphical overlay. The virtual overlay is shown to have vertical lines that extend down the left, right, and center of soft-keys displayed on the touch screen of the mobile device. It should be understood that the lines of the virtual overlay are not actually displayed to the user, but rather may be stored in memory in relation to the soft-keys. In one embodiment, a feature that allows for the soft-keys to be dual-purpose keys depending on which side a soft-key is pressed, may be made available as a result of using the virtual input overlay. For example, a volume control with a single soft-key may provide for increase volume/decrease volume depending on whether the user is pressing a left side or right side of a soft-button. The mobile device may sense which side of the soft-button is being pressed by applying the sensed touch point to the virtual graphical overlay and then perform the desired function.

Example Pseudo code

```
int lastDownEvent;
// Called every time the screen is touched, any place.
callback touchListener( )
{
    if(touched){
        lastDownEvent = SystemCurrentTime;
    }
}
// Called when a key is released on the soft keyboard
callback onKeyRelease( )
{
    keyDown = lastDownEvent
    keyUp = SystemCurrentTime;
}
```

What is claimed is:

1. A method for capturing events in a sensor device, the method comprising:
   overlaying a virtual interface over an interface of an operating system of said sensor device, said virtual interface having a higher resolution than said interface of said operating system;
   upon a user performing an action on said sensor device, running a background process associated with said virtual interface, said background process capturing events triggered by said action on said virtual interface at said higher resolution;
   providing said captured events, captured at said higher resolution to a processing unit of said operating system; and
   passing events to a foreground process running on said processor to respond to said action performed by said user based on said provided captured events;
   wherein said overlaying comprises overlaying said virtual interface only over a portion of said interface of said operating system and
   capturing comprises said virtual interface capturing events occurring outside an area covered by said virtual interface.

2. The method of claim 1, wherein said virtual interface comprises a transparent interface layer overlaying said interface of said operating system, and said user action is carried out on an element of said interface of said operating system.

3. The method of claim 1, wherein said virtual interface comprises a Graphic User Interface (GUI) layer overlaying said interface of said operating system, and said user action is carried out on an element of said virtual interface.

4. The method of claim 1, wherein said capturing events comprises said background process capturing events, sensed by said virtual interface, which events are not sensed by said interface of said operating system.

5. The method of claim 1, wherein said captured events comprise timing and duration of said action.

6. The method of claim 1, wherein said action comprises pressing a button of said interface of said operating system, and said captured events comprise a touch time of said button, a release time of said button, and a duration of said pressing.

* * * * *